US012675386B2

(12) United States Patent
Harris

(10) Patent No.: US 12,675,386 B2
(45) Date of Patent: Jul. 7, 2026

(54) PROVIDING CLIENT SUPPORT FOR APPLICATIONS TO SOFTWARE SERVICES

(71) Applicant: Truist Bank, Charlotte, NC (US)

(72) Inventor: Shawn N. Harris, Cookeville, TN (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 18/734,080

(22) Filed: Jun. 5, 2024

(65) Prior Publication Data

US 2025/0378005 A1      Dec. 11, 2025

(51) Int. Cl.
*G06F 11/00*      (2006.01)
*G06F 11/07*      (2006.01)
*G06F 11/14*      (2006.01)
*G06F 11/3604*      (2025.01)

(52) U.S. Cl.
CPC ...... G06F 11/3612 (2013.01); G06F 11/0751 (2013.01); G06F 11/1438 (2013.01)

(58) Field of Classification Search
CPC ............. G06F 11/3612; G06F 11/1438; G06F 11/0751; G06F 11/079; G06F 11/0793
See application file for complete search history.

(56) References Cited

U.S. PATENT DOCUMENTS

| | | | | |
|---|---|---|---|---|
| 7,653,592 B1* | 1/2010 | Flaxman | ................ | G06Q 40/03 |
| | | | | 705/37 |
| 10,331,855 B1* | 6/2019 | Bratton | ................... | G16H 20/00 |
| 10,992,513 B1* | 4/2021 | Dixon | .................... | H04L 67/14 |
| 11,475,214 B1* | 10/2022 | Chacko | ................. | G06F 40/174 |
| 2016/0110334 A1* | 4/2016 | Yu | ........................ | G06F 11/0769 |
| | | | | 715/223 |
| 2025/0252252 A1* | 8/2025 | Shetty | .................. | G06K 7/1417 |

* cited by examiner

*Primary Examiner* — Joseph D Manoskey
(74) *Attorney, Agent, or Firm* — Kilpatrick Townsend & Stockton LLP; Michael A. Springs, Esq.

(57)      ABSTRACT

Client support for applications to access services can be provided. In an example, a computing system can receive, from a client device, text input for an in-progress application to access a service. The client may be prevented from accessing the service prior to the in-progress application being approved. The computing system can detect an error associated with processing the in-progress application based on the text input and contextual information. The computing system can determine that the error is associated with the text input or with a technical issue associated with the in-progress application. The computing system can generate a recommendation associated with the error based on determining that the error is associated with the text input or technical issue. The computing system may output the recommendation to the client device for use in resolving the error with processing the in-progress application.

20 Claims, 3 Drawing Sheets

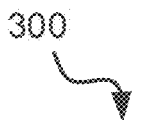

300

---

302
Receive, from a client device, text input for an in-progress application to access a service

---

304
Detect an error associated with processing the in-progress application based on the text input and contextual information associated with the in-progress application

---

306
Determine that the error is associated with the text input or with a technical issue associated with the in-progress application

---

308
Generate a recommendation associated with the error based on determining that the error is associated with the text input or the technical issue

---

310
Output the recommendation for use in resolving the error with processing the in-progress application.

PROVIDING CLIENT SUPPORT FOR APPLICATIONS TO SOFTWARE SERVICES

TECHNICAL FIELD

The present disclosure relates generally to software services and, more particularly (although not necessarily exclusively), providing client support for applications to software services.

BACKGROUND

Some services (e.g., software services) may have restricted access. For instance, a service may only be accessible after approval of an application to access the service. Such applications may be relatively complex or lengthy. It may be difficult for users to identify a source of issues that may arise when filling out or submitting such an application.

BRIEF DESCRIPTION OF THE DRAWINGS

FIG. 3 is a flow chart of an example of a process for providing client support for an application to a service, according to some aspects of the present disclosure.

DETAILED DESCRIPTION

Figure 1:
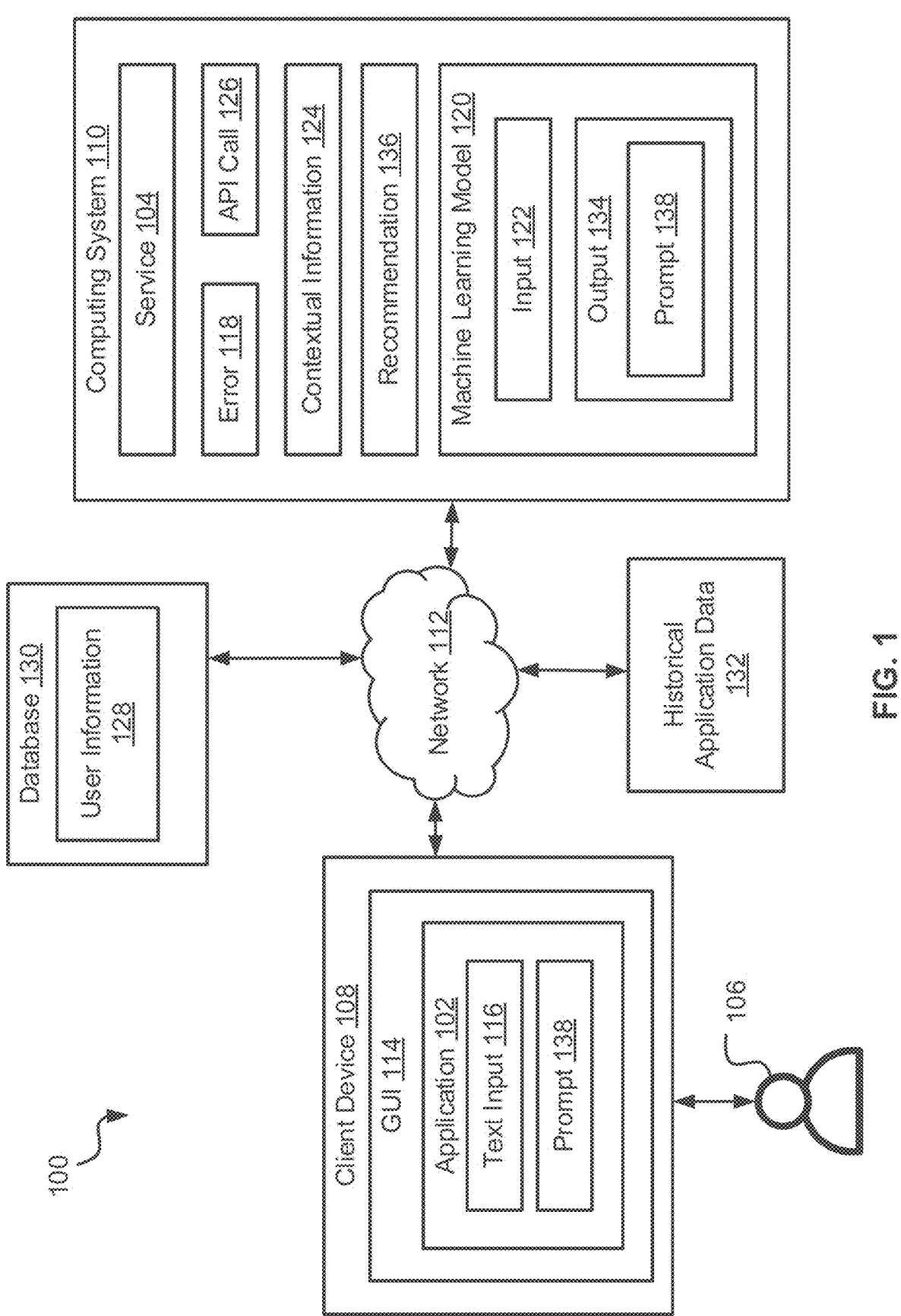
FIG. 1 is a block diagram of an example of a system for providing client support for an application to a service, according to some aspects of the present disclosure.

Certain aspects and examples of the present disclosure relate to using artificial intelligence to aid in completing applications to services (e.g., software services). Applying for access to a service may be a complex, multi-stage process with multiple failure points. Errors in processing the application may occur based on inaccurate or missing information (e.g., provided by a user), technical issues (e.g., network connectivity errors or server time-outs), and the like. Users may be unaware of the cause of the errors and may re-submit or restart new applications that may also fail or be rejected unnecessarily. Repeat efforts to successfully complete the application may be time-consuming and may waste networking and computing resources.

Some examples described herein can address one or more of the abovementioned problems by automatically detecting or predicting errors with in-progress applications in real-time and generating recommendations to resolve the errors. For example, a computing system can monitor the text input for an in-progress application as well as contextual information. The contextual information can include any data associated with the current instance of the in-progress application, such as the client device, network, or web browser used to access the application. The computing system may detect errors by determining that the application is locked for editing, determining that a first stage of the application has failed and cannot progress to a second stage, detecting a server time-out, or the like. In some examples, the computing system may predict that an error may occur based on the text input and the contextual data, such as by using a machine learning model trained on historical application data.

After predicting or detecting the error, the computing system can determine whether the error is associated with the text input (e.g., due to the user providing inaccurate, missing, or incorrect text input) or has a technical cause (e.g., due to network connectivity errors, device failures, etc.). Recommendations for resolving the error can be generated based on this classification. For example, if the error was likely to result from user error, the recommendation can include prompts to provide potentially missing information or correct potentially inaccurate information. If the error was likely to result from technical malfunctions, the recommendation may involve restarting the application, switching to a more stable network or a different web browser, etc. The computing device can output the recommendation to the client device (e.g., as text prompting the user to perform the recommendation). Providing prompts in real time to guide the user to successfully complete the in-progress application can reduce unnecessary repeated application attempts, allowing for faster processing of applications and increased efficiency in computing resource consumption for the computing system.

In some examples, detection or prediction of errors can be determined using a machine learning model that is trained on historical application data. The text input and contextual information can be provided as input to the machine learning model, which can generate an output identifying the error. The machine learning model may be trained to generate predictions for whether the error as being caused by user error or technical issues. In some examples, the machine learning model may also be used to generate recommendations for resolving the error. For example, the error, text input, and contextual data may be provided as input to one or more machine learning models. The machine learning models may generate the recommendation based on the input. In some examples, the machine learning models may include a natural language processing (NLP) model that is trained to generate a text prompt describing the recommendation in a natural language format. This text prompt can be output to the client device.

In a particular example, a user may provide text inputs to an application used to determine access to a network. The network may only be accessed after approval of the application. The application may be a lengthy, multi-stage application that may require a significant amount of information, such as user information, location information, or device information for devices that would be used to access the network. It may be common for users to inadvertently supply inaccurate or incomplete information in such an application. For example, the user may forget to list each of the devices that would be used to access the network, such as the device that is used to fill out the application. The user may additionally skip important fields of the application or may provide insubstantial information. Technical errors may also occur while filling out the application. For example, the application may be accessed in a web browser that is incompatible with the application. Or, the application may be accessed with a web browser that is out of date. Incompatible or out of date web browsers may prevent the application from being filled out or submitted.

An error may be detected while the user is completing the application. For example, the application may be locked for editing or the application may be unable to be submitted. The text inputs provided by the user, as well as a user information or contextual information (e.g., data indicating the device, network, web browser, etc. used to access the application) may be used to determine the source of the error, such as a text input issue or a technical issue. In this example, the computing system may classify the error as being a technical issue based on detecting (e.g., in contextual data) that the application is being filled out using an incompatible web browser that is preventing viewability of some portions of the application. The computing device can then generate a recommendation involving switching to a web browser that is compatible with the application. This recommendation may be output to the device being used to access the application, guiding the user to fill out the application in the different web browser and thus resolving the error.

These illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a system 100 for providing client support for an application 102 to a service 104, according to some aspects of the present disclosure. The system 100 may provide services 104 hosted by a computing system 110. The services 104 may be accessed by a user 106 via a client device 108. Examples of the client device 108 and computing system 110 can include a laptop computer, desktop computer, tablet, e-reader, smart watch, smart phone, server, or any suitable type of computing device. Components of the system 100 may be communicatively coupled via a network 112, such as the Internet, a personal area network, a local area network (LAN), a wide area network (WAN), a wireless local area network (WLAN), or the like.

The computing system 110 may provide a graphical user interface (GUI) 114 to be presented on the client device 108. The user 106 may interact with the GUI 114 to fill out an application 102 requesting access to a service 104 (e.g., a software service) hosted by the computing system 110. For example, the application 102 may include multiple stages at which the user 106 can interact with the GUI 114 to provide input such as text input 116 answering questions, providing information, enabling permissions, and the like. The application 102 may be processed by the computing system 110 to determine whether to deny or allow the user 106 access to the service 104. In some examples, an entity (e.g., an administrator) can adjust a risk tolerance level for accessing the service 104. For example, the entity can configure a setting associated with a risk tolerance level. If the value of the setting is higher, it may mean that the risk tolerance is higher and more users should be able to access the service 104. If the value is lower, it may mean that the risk tolerance is lower and fewer users should be able to access the service 104. The computing system 110 may determine whether to deny or allow the user 106 access to the service 104 based on the value of the setting.

In some examples, errors may arise in processing the application 102. Such errors may include technical errors such as network connectivity errors. Other errors may result from inaccurate or incomplete text input 116 from the user 106. For example, the application 102 may be a multi-stage application, in which a first stage must be completed and processed before progressing to a second stage. The user 106 may be unable to continue to the second stage if errors arise in processing the first stage. In some examples, it may be difficult or impossible for the user 106 to identify the error that is preventing the first stage from being processed. Or, once the application 102 is complete, the computing system 110 may be unable to process the application 102 or the application 102 may be denied due to incorrect, missing, or inaccurate text input 116. Unnecessarily denied applications or applications that are unable to be processed may result in the user 106 restarting a new application 102, which may also have the same errors.

To help guide the user 106 through the process of filling out the application 102, and to prevent unnecessary repeat submissions of applications, the computing system 110 can detect or predict errors 118 associated with the application 102 that is in progress (e.g., that a user 106 is currently filling out, prior to submission). For example, the computing system 110 may detect that processing of a first stage of the application 102 has failed or been denied, which may prevent the application 102 from progressing to a second stage. In another example, the computing system 110 may detect that the application 102 may be locked for editing, or that a web page used to access the application 102 has crashed. In other examples, the client device 108 can send a notification to the computing system 110 indicating that the error 118 has occurred. The computing system 110 may also predict errors 118 associated with the text input 116 provided by the user 106, or based on contextual information 124 associated with filling out the application 102. In response to detecting or predicting an error 118, the computing system 110 can automatically generate recommendations 136 that can guide the user 106 in successfully filling out the application 102.

In some examples, some or all techniques described herein such as detecting or predicting errors 118 or generating recommendations 136 may be performed using a machine learning model 120. The machine learning model 120 may include any suitable type or combination of machine-learning models. For example, the machine learning model 120 may include a neural network, such as a generative pre-trained transformer (GPT) model. In some examples, the machine learning model 120 may be an ensemble of models. The machine learning model 120 may perform natural language processing (NLP). NLP is a subfield of machine learning and computer science that involves an interaction between computers and humans using human languages. An objective of NLP can be to extract meaning and understanding from content of human communication in text and speech. NLP can be used to automate a process based on what a person says. For example, the machine learning model 120 can generate a prompt 138 that describes the recommendation 136 in a natural language format.

The computing system 110 may train the machine learning model 120 (e.g., in a supervised or unsupervised training process) based on historical application data 132 (e.g., historical text inputs of applications). The machine learning model 120 can use the historical application data 132 as a training dataset during a training process to learn how to interpret natural language inputs (e.g., text input 116) and provide recommendations 136 in a natural language format. The historical application data 132 may also include anonymized user information and contextual information associated with the anonymized text inputs. The user information can include demographic information, account history information, or any other information associated with the user filling out the application 102. The contextual information may include any data collected while the application 102 was being completed. This can include device information for the client device 108 used to complete the application 102, network information, web browser used to complete the application 102, time of day the application 102 was filled out, length of time involved in completing the application 102, history of errors that occurred while completing the application, or any other suitable contextual data.

The computing system 110 can determine whether the error 118 is associated with the text input 116 or caused by a technical issue. For example, the computing system 110 may detect a discrepancy between information described in text input provided in different fields of the application. Thus, the error 118 may be associated with the text input 116. In other examples, the computing system 110 may determine that the error 118 is associated with the text input 116 by identifying an inaccuracy in the text input 116 (e.g., by comparing the text input 116 to user information 128 for the user 106 and detecting a difference), identifying missing information in a required field of the application 102, or the like. The computing system 110 may identify the portion of the application 102 and the text input 116 that is associated with the error 118 and can generate a recommendation 136 for resolving the error 118. For example, the computing system 110 can access a lookup table mapping recommendations to types of text input errors.

In other examples, the computing system 110 can determine that the error 118 is associated with or likely caused by a technical issue. For example, the computing system 110 may detect network connectivity issues, network speed being below a threshold value, use of a web browser that is incompatible with the application 102, a server time-out, or the like. The computing system 110 may determine that the error 118 is likely caused by the technical issue based on the contextual information 124. The computing system 110 may generate recommendations 136 that suggest technical adjustments for errors 118 caused by technical issues (e.g., based on a lookup table). For example, errors related to network issues may result in a recommendation 136 to switch to a different network. Errors related to the application 102 not functioning properly (e.g., being locked for editing, not progressing to a next stage of the application 102, or the application 102 crashing) may result in a recommendation 136 to restart the application 102. In some examples, the computing system 110 may automatically restart the application 102 in response to detecting that the error 118 is caused by a technical issue. For example, the computing system 110 may save all text input 116 (or other input) for the current instance of the application 102 and may generate a new instance of the application 102 that includes the text input 116 (e.g., by pre-populating fields of the application 102 with the text input 116) that was previously provided by the user 106. In another example, the computing system 110 may detect or predict an error 118 based contextual information 124 indicating that the application 102 is being accessed via a web browser that is incompatible with the application 102, GUI 114, or computing system 110. This incompatibility may result in difficulties in submitting text input 116 or processing the application 102. The computing system 110 may therefore generate a recommendation 136 to switch to accessing the application 102 via a more optimal or compatible web browser.

In some examples, the computing system 110 can provide the text input 116 and the recommendation 136 as input 122 to the machine learning model 120. The machine learning model 120 generate an output 134 based on the input 122 that includes a prompt 138 to the user that describes the recommendation 136. The prompt 138 may be in a natural language format. The prompt 138 can be output to the client device 108 and presented via the GUI 114. For example, the computing system 110 can cause the GUI 114 to highlight the field of the application 102 relating to the error 118, such as the field at which the user 106 provided text input 116 that was identified as causing the error 118. The computing system 110 can also cause the GUI 114 to display the prompt 138 (e.g., as a text pop-up) near the highlighted field that directs the user 106 to double-check the text input 116 provided for a particular field of the application 102. Or, in other examples, the prompt 138 may direct the user 106 to provide missing information (e.g., if a field of the application 102 was not filled out or had little text input 116 provided), or to correct an identified inaccuracy in the text input 116. For example, when the detected or predicted error 118 involves detecting a contradiction between a first text input for a first field of the application 102 and a second text input for a second field of the application 102, the prompt 138 may direct the user 106 to correct the first field or the second field. The computing system 110 can cause the GUI 114 to highlight the first field and the second field and display the prompt 138 (e.g., as a text pop-up) that informs the user 106 of the discrepancy and requests correction of the first field or the second field. The user 106 may implement the recommendation 136. As errors 118 can therefore be corrected or avoided based on the recommendation 136, the application 102 may then be processed. If the application 102 is approved, the computing system 110 can then enable the client device 108 to access the service 104.

In some examples, information beyond the text input 116 may be used to detect or predict the error 118, or to generate the recommendation 136. This can include contextual information 124 for the current session of the in-progress application 102, such as account information for the account used to access the application 102, time stamps for when text input 116 is received, fields of the application 102 associated with portions of text input 116, device and networking information for the client device 108, web browsers used to access the application 102, time of day and length of session for filling out the application 102, or any other suitable contextual information. This can also include user information 128 associated with the user 106, such as demographic information, account history information, or any other information associated with the user filling out the application 102. For example, the computing system 110 may access (e.g., via an application programming interface (API) call 126) a database 130 storing user information 128. The computing system 110 may be authorized to access the user information 128 based on permissions enabled via the application 102.

The machine learning model 120 may also, in some examples, be used to detect or predict the error 118. For example, each time the computing system 110 receives text input 116 from the client device 108, the text input 116 may be automatically input 122 into the machine learning model 120. The machine learning model 120 may generate an output 134 classifying the text input 116 as being associated with a potential error 118. For example, for applications that are approved, a particular field of such applications may typically have several paragraphs of submitted text input. If the text input 116 for such a field has only a single sentence, the machine learning model 120 may automatically generate a classification of an error 118 indicating that the text input 116 may be insufficient. The machine learning model 120 may additionally generate a recommendation 136 for resolving the error 118, such as a prompt 138 to provide additional information as text input 116 for the particular field.

In a particular example, a user 106 may provide text inputs 116 to an application 102 used to determine access to a lending service. The application 102 may be a lengthy, multi-stage application that may require a significant amount of information. This may include a comprehensive financial history for the user 106. It may be common for users to inadvertently supply inaccurate or incomplete information in such an application. For example, the application 102 may include a field requesting an annual income. Instead of inputting their annual income, the user 106 may input a monthly income. In another example, a user 106 may forget to list each of their assets. Some users may additionally skip important fields of the application or may provide insubstantial information, such as neglecting to fully explain a purpose for applying for access to the lending service. There may be many reasons why user-supplied text input may result in errors in processing the application 102.

Each time the text input 116 is provided, the computing system 110 can monitor the text input 116 and contextual information 124 to detect or predict errors 118 associated with processing the application 102. Thus, the computing system 110 may predict errors 118 before or while the application 102 is completed and processed and may provide recommendations 136 to adjust the text input 116 to prevent such errors 118. For example, the computing system 110 may identify the text input 116 as being associated with a potential inaccuracy for a monthly income value (e.g., a relatively low value) being input into a field requesting an annual income (e.g., a relatively high value). Thus, the computing system 110 may generate and output a prompt 138 recommending that the user 106 report the correct type of income. In another example where little or no assets are reported for a relatively high income, the computing system 110 may generate a prompt 138 recommending that the user 106 make sure that they are reporting all assets. In yet another example, the computing system 110 may generate a prompt 138 recommending that further explanation be provided for a field of the application 102 requesting a purpose for accessing the lending service, as failing to provide enough detail may result in the application 102 being denied. Guiding the user 106 in such a way to ensure that accurate and complete applications are submitted can prevent submission of unnecessary repeat applications.

Although FIG. 1 depicts a certain number and arrangement of components, this is for illustrative purposes and is intended to be non-limiting. Other examples may include more components, fewer components, different components, or a different arrangement of the components shown in FIG. 1.

Figure 2:
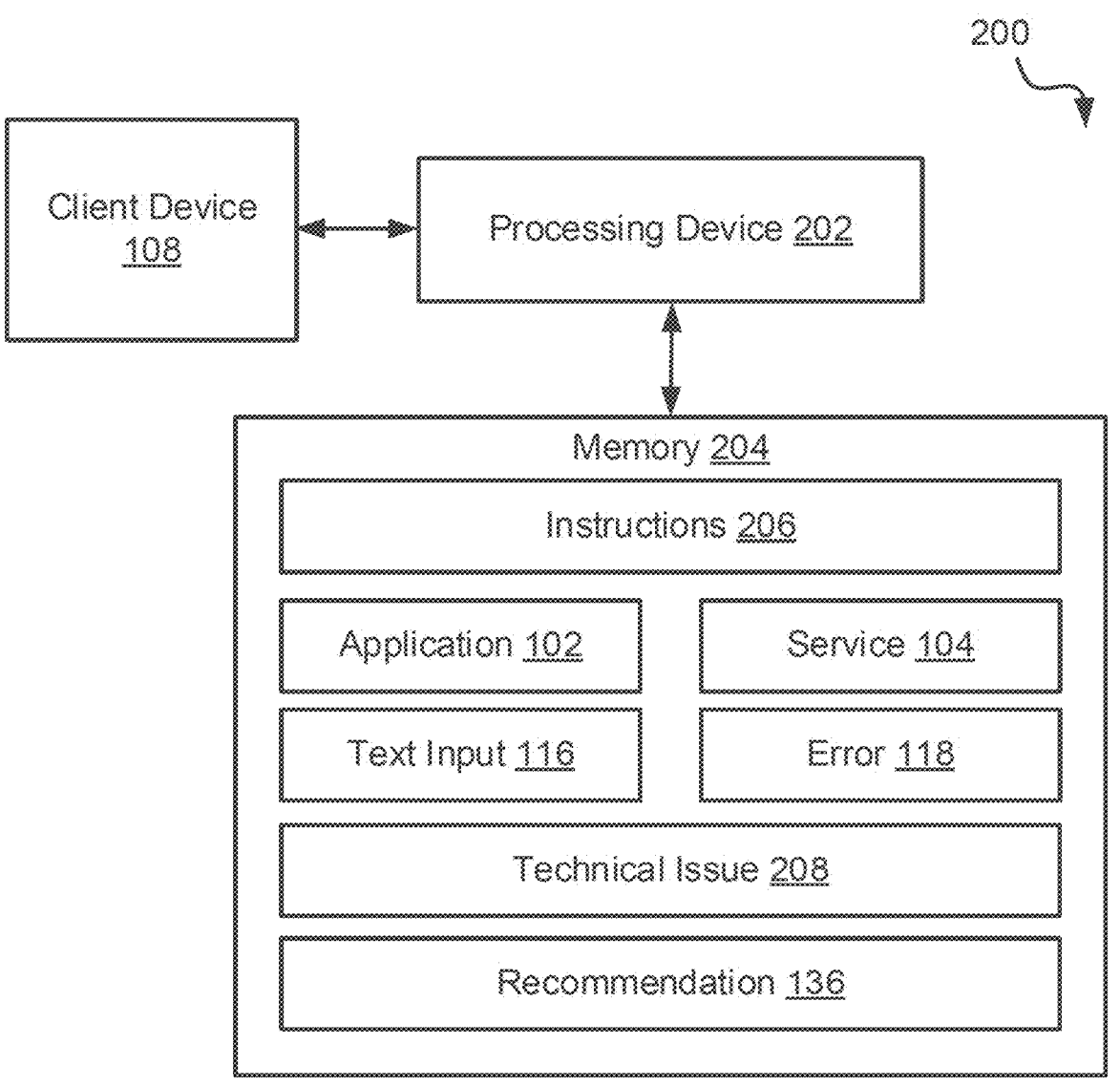
FIG. 2 is a block diagram of another example of a system for providing client support for an application to a service, according to some aspects of the present disclosure.

FIG. 2 is a diagram of another example of a system 200 providing client support for an application to a service, according to some aspects of the present disclosure. The system 200 includes a processing device 202 that is communicatively coupled to a memory 204. In some examples, the processing device 202 and the memory 204 may be distributed from (e.g., remote to) one another.

The processing device 202 can include one processing device or multiple processing devices. Non-limiting examples of the processing device 202 include a Field-Programmable Gate Array (FPGA), an application-specific integrated circuit (ASIC), or a microprocessor. The processing device 202 can execute instructions 206 stored in the memory 204 to perform operations. In some examples, the instructions 206 can include processor-specific instructions generated by a compiler or an interpreter from code written in a suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory, computer-readable medium from which the processing device 202 can read instructions 206. A computer-readable medium can include electronic, optical, magnetic, or other storage devices capable of providing the processing device 202 with computer-readable instructions or other program codes. Non-limiting examples of a computer-readable medium include magnetic disk(s), memory chip(s), ROM, random-access memory (RAM), an ASIC, a configured processor, optical storage, or any other medium from which a computer processor can read the instructions 206.

The memory 204 can include instructions 206 for receiving, from a client device 108, text input 116 for an in-progress application 102 to access a service 104. The client device 108 may be prevented from accessing the service 104 prior to the in-progress application 102 being approved. The processing device 202 can detect an error 118 associated with processing the in-progress application 102 based on the text input 116 and contextual information 124 associated with the in-progress application 102. The processing device 202 can determine that the error 118 is associated with the text input 116 or with a technical issue 208 associated with the in-progress application 102. The processing device 202 can generate a recommendation 136 associated with the error 118 based on determining that the error 118 is associated with the text input 116 or the technical issue 208. The processing device 202 can output the recommendation 136 to the client device 108 for use in resolving the error 118 with processing the in-progress application 102.

Turning now to FIG. 3, shown is a flow chart of an example of a process 300 for providing client support for an application to a service, according to some aspects of the present disclosure. Other examples can involve more operations, fewer operations, different operations, or a different order of operations shown in the figures. The operations of FIG. 3 will now be described below with reference to the components described above in FIGS. 1-2. Some or all of the steps of the process 300 can be performed by the processing device 202.

At block 302, the processing device 202 can receive, from a client device 108, text input 116 for an in-progress application 102 to access a service 104. The service 104 may only be accessed if the processing device 202 successfully processes and approves the application 102. That is, the client device 108 may be prevented from accessing the service 104 prior to the in-progress application 102 being approved. The text input 116 may be in a natural language format. In some examples, the text input 116 may answer questions posed by the application 102 or may provide information requested by the application 102. The processing device 202 may also receive or detect contextual information 124 associated with an instance of the application 102 being completed (e.g., by a user 106).

At block 304, the processing device 202 can detect an error 118 associated with processing the in-progress application 102 based on the text input 116 and the contextual information 124 associated with the in-progress application 102. The error 118 may result in an inability to process the application 102. For example, the application 102 may be locked for editing and the user 106 may be unable to progress to a next stage of the application 102. In another example, a first stage of the application 102 may have been processed and denied, preventing the user 106 from progressing to a second stage of the application 102. In further examples, the processing device 202 may predict an error 118 based on detecting an inaccuracy or missing information in the text input 116. For example, the processing device 202 may access (e.g., via an API call 126), based on the text input 116 (which in some examples may authorize the access), user information 128 associated with a user 106 providing the text input 116. The processing device 202 may detect the error 118 based on a comparison between the user information 128 and the text input 116 to the in-progress application 102.

In some examples, the processing device 202 may predict a potential error 118 associated with the application 102, such as by providing the text input 116 (along with, in some examples, contextual information 124 or user information 128) as input 122 to a machine learning model 120 that can detect or predict the error 118. The machine learning model 120 may generate an output 134 classifying the error 118, such as by identifying inaccurate or missing information in the text input 116 (e.g., based on the user information 128), identifying a technical issue based on contextual information 124, or the like.

At block 306, the processing device 202 can determine that the error 118 is associated with the text input 116 or with a technical issue 208 associated with the in-progress application 102. The processing device 202 may determine that the error 118 is associated with the text input 116 if the processing device 202 detects missing or inaccurate text input 116. The processing device 202 may determine that the error 118 is associated with the technical issue 208 based on the contextual information 124, which may include network information, device information, and the like.

At block 308, the processing device 202 may generate, by executing the machine learning model 120, a recommendation 136 associated with the error 118 based on determining that the error 118 is associated with the text input 116 or the technical issue 208. Recommendations for text input errors may involve recommending adjustments to the text input 116. The recommendation 136 may specify the portion of the text input 116 that is to be adjusted. For example, if the error 118 is associated with the text input 116, the recommendation 136 may involve providing missing information to a particular field of the application 102, correcting an identified inaccuracy in an identified portion of the text input 116, or the like. The recommendation 136 may be a classification of an adjustment (e.g., an adjustment to the text input 116 or a technical adjustment) associated with the error 118. If the error 118 is associated with a technical issue 208, the recommendation 136 may involve switching a network or a web browser used by the client device 108 or restarting the application 102. In some examples, in response to detecting that the error 118 is a technical issue 208, the processing device 202 may automatically restart the application 102. The processing device 202 may generate a prompt 138 directing the user 106 to execute the recommendation 136. For example, the processing device 202 may execute the machine learning model 120, which may include a natural language processing (NLP) model, to generate a prompt 138 describing the error 118 and the recommendation 136 in a natural language format.

At block 310, the processing device 202 may output the recommendation 136 to the client device 108 for use in resolving the error 118 with processing the in-progress application 102. For example, the prompt 138 may be presented on the client device 108 via a graphical user interface (GUI) 114 for the application 102. Prompts 138 generated by the machine learning model 120 can guide the user 106 through the process of filling out the application 102 to prevent errors 118 before submission, resolve errors 118 after they have been detected, or provide instructions to restart the application 102 if errors 118 are unresolvable in a current instance. Subsequent to outputting the recommendation 136, the application 102 may be submitted (e.g., without errors 118). If the application 102 is approved, the processing device 202 may enable the client device 108 to access the service 104.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a non-transitory memory including instructions that are executable by the processing device for causing the processing device to, prior to submission of an in-progress application:
receive, from a client device, text input for the in-progress application to access a service, wherein the client device is prevented from accessing the service prior to the in-progress application being approved;
detect an error associated with processing the in-progress application based on the text input and contextual information associated with the in-progress application;
determine that the error is associated with a technical issue associated with the in-progress application; and
in response to determining that the error is associated with the technical issue, automatically restart the in-progress application by generating a new instance of the in-progress application that is pre-populated with the text input received from the client device.

2. The system of claim 1, wherein the error is a first error, and wherein the memory further includes instructions that are executable by the processing device for causing the processing device to:
detect a second error associated with the text input;
determine that the second error involves missing information; and
generate, based on the second error involving missing information, a recommendation involving providing the missing information as additional text input for the in-progress application.

3. The system of claim 2, wherein the memory further includes instructions that are executable by the processing device for causing the processing device to, in response to determining that the second error is associated with the text input:
identify an inaccuracy in the text input, and wherein the recommendation involves correcting the inaccuracy.

4. The system of claim 2, wherein the memory further includes instructions that are executable by the processing device for causing the processing device to:
access, based on the text input, user information associated with a user providing the text input; and
detect the second error based on a comparison between the user information and the text input to the in-progress application.

5. The system of claim 1, wherein the memory further includes instructions that are executable by the processing device for causing the processing device to, in response to determining that the error is associated with the technical issue, generate a recommendation that involves switching a network.

6. The system of claim 1, wherein the memory further includes instructions that are executable by the processing device for causing the processing device to, subsequent to automatically restarting the in-progress application, enable the client device to access the service based on approving the in-progress application.

7. The system of claim 1, wherein the memory further includes instructions that are executable by the processing device for causing the processing device to, in response to determining that the error is associated with the technical issue, generate a recommendation involving switching a web browser for the in-progress application.

8. The system of claim 1, wherein the error is a first error, and wherein the memory further includes instructions that are executable by the processing device for causing the processing device to, prior to submission of the in-progress application:

generate, by executing a machine learning model trained on historical application data, a prediction of a second error associated with the text input, wherein the prediction is generated by the machine learning model based on receiving an input comprising the text input and the contextual information; and generate a recommendation for correcting the text input based on the prediction of the second error.

9. A method comprising, prior to submission of an in-progress application:

receiving, by a processing device and from a client device, text input for the in-progress application to access a service, wherein the client device is prevented from accessing the service prior to the in-progress application being approved;

detecting, by the processing device, an error associated with processing the in-progress application based on the text input and contextual information associated with the in-progress application;

determining, by the processing device, that the error is associated with a technical issue associated with the in-progress application; and in response to determining that the error is associated with the technical issue, automatically restarting, by the processing device, the in-progress application by generating a new instance of the in-progress application that is pre-populated with the text input received from the client device.

10. The method of claim 9, wherein the error is a first error, and wherein the method further comprises:

detecting a second error associated with the text input;

determining that the second error involves missing information; and generating, based on the second error involving missing information, a recommendation involving providing missing information as additional text input for the in-progress application.

11. The method of claim 10, further comprising, in response to determining that the second error is associated with the text input:

identifying an inaccuracy in the text input, wherein the recommendation involves correcting the inaccuracy.

12. The method of claim 10, further comprising:

accessing, based on the text input, user information associated with a user providing the text input; and detecting the second error based on a comparison between the user information and the text input to the in-progress application.

13. The method of claim 9, further comprising, in response to determining that the error is associated with the technical issue:

generating a recommendation that involves switching a network or a web browser.

14. The method of claim 9, further comprising, subsequent to automatically restarting the in-progress application:

enabling the client device to access the service based on approving the in-progress application.

15. A non-transitory computer-readable medium comprising program code that is executable by a processing device for causing the processing device to, prior to submission of an in-progress application:

receive, from a client device, text input for the in-progress application to access a service, wherein the client device is prevented from accessing the service prior to the in-progress application being approved;

detect an error associated with processing the in-progress application based on the text input and contextual information associated with the in-progress application;

determine that the error is associated with a technical issue associated with the in-progress application; and in response to determining that the error is associated with the technical issue, automatically restart the in-progress application by generating a new instance of the in-progress application that is pre-populated with the text input received from the client device.

16. The non-transitory computer-readable medium of claim 15, wherein the error is a first error, and wherein the program code is further executable by the processing device for causing the processing device to:

detect a second error associated with the text input;

determine that the second error involves missing information; and generate, based on the second error involving missing information, a recommendation involving providing missing information as additional text input for the in-progress application.

17. The non-transitory computer-readable medium of claim 16, wherein the program code is further executable by the processing device for causing the processing device to, in response to determining that the second error is associated with the text input:

identify an inaccuracy in the text input, and wherein the recommendation involves correcting the inaccuracy.

18. The non-transitory computer-readable medium of claim 16, wherein the program code is further executable by the processing device for causing the processing device to:

access, based on the text input, user information associated with a user providing the text input; and detect the second error based on a comparison between the user information and the text input to the in-progress application.

19. The non-transitory computer-readable medium of claim 15, wherein the program code is further executable by the processing device for causing the processing device to, in response to determining that the error is associated with the technical issue, generate a recommendation that involves switching a network or a web browser.

20. The non-transitory computer-readable medium of claim 15, wherein the program code is further executable by the processing device for causing the processing device to, subsequent to automatically restarting the in-progress application, enable the client device to access the service based on approving the in-progress application.

\* \* \* \* \*